(12) United States Patent
Stathakis et al.

(10) Patent No.: US 11,626,941 B2
(45) Date of Patent: Apr. 11, 2023

(54) METHODS, APPARATUS AND COMPUTER-READABLE MEDIUMS RELATING TO SCHEDULING AND FEEDBACK SCHEMES FOR THE TRANSMISSION OF DATA PACKETS IN A WIRELESS COMMUNICATION NETWORK

(71) Applicant: Telefonaktiebolaget LM Ericsson (publ), Stockholm (SE)

(72) Inventors: Efthymios Stathakis, Stockholm (SE); Gustav Wikström, Täby (SE); Kittipong Kittichokechai, Järfälla (SE); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 17/042,807

(22) PCT Filed: Apr. 25, 2018

(86) PCT No.: PCT/SE2018/050423
§ 371 (c)(1),
(2) Date: Sep. 28, 2020

(87) PCT Pub. No.: WO2019/209147
PCT Pub. Date: Oct. 31, 2019

(65) Prior Publication Data
US 2021/0028889 A1    Jan. 28, 2021

(51) Int. Cl.
*H04L 1/1867* (2023.01)
*H04L 1/1812* (2023.01)
(Continued)

(52) U.S. Cl.
CPC .............. *H04L 1/189* (2013.01); *H04L 1/188* (2013.01); *H04L 1/1812* (2013.01);
(Continued)

(58) Field of Classification Search
None
See application file for complete search history.

(56) References Cited

U.S. PATENT DOCUMENTS

2006/0195629 A1    8/2006   Sharma et al.
2006/0291395 A1    12/2006  Ketonen et al.
(Continued)

OTHER PUBLICATIONS

International Search Report and Written Opinion for International Application No. PCT/SE2018/050423, dated Jan. 15, 2019, 11 pages.
(Continued)

*Primary Examiner* — Marcus Smith
(74) *Attorney, Agent, or Firm* — Nicholson De Vos Webster & Elliott LLP (57) ABSTRACT

A method, apparatus and computer-readable mediums relating to the transmission of data packets in a wireless communication network. The method, performed by a node of a wireless communication network, for selecting a feedback scheme associated with transmission of data packets over one or more radio bearers to one or more wireless devices. The method comprises: upon receiving a data packet for transmission to a wireless device, starting a timer associated with the data packet, the timer being set to expire after a period of time which varies as a function of a latency requirement for the data packet; and, in dependence on a remaining time value for the timer, selecting one of a plurality of feedback schemes for transmission of the data packet.

17 Claims, 5 Drawing Sheets

(51) Int. Cl.
*H04W 28/02* (2009.01)
*H04W 28/06* (2009.01)

(52) U.S. Cl.
CPC ....... *H04L 1/1887* (2013.01); *H04W 28/0284* (2013.01); *H04W 28/06* (2013.01)

(56) References Cited

U.S. PATENT DOCUMENTS

| | | | |
|---|---|---|---|
| 2011/0305140 A1* | 12/2011 | Wang | H04W 72/121 |
| | | | 370/232 |
| 2014/0286256 A1* | 9/2014 | Chowdhury | H04L 47/14 |
| | | | 370/328 |
| 2018/0302193 A1* | 10/2018 | Akkarakaran | H04L 1/1854 |
| 2018/0324642 A1* | 11/2018 | Yu | H04W 28/065 |
| 2019/0158251 A1* | 5/2019 | Park | H04L 1/08 |
| 2019/0280827 A1* | 9/2019 | Lyu | H04L 1/0002 |
| 2019/0289616 A1* | 9/2019 | Hampel | H04B 7/0413 |
| 2019/0356422 A1* | 11/2019 | Shimomura | H04L 1/1671 |
| 2019/0364543 A1* | 11/2019 | Ugurlu | H04W 72/0446 |
| 2020/0067587 A1* | 2/2020 | Wen | H04L 1/0027 |
| 2020/0068437 A1* | 2/2020 | Löhr | H04W 76/27 |
| 2020/0304248 A1* | 9/2020 | Lunttila | H04L 1/1854 |

OTHER PUBLICATIONS

International Preliminary Report on Patentability for International Application No. PCT/SE2018/050423, dated Nov. 5, 2020, 9 pages.
Communication pursuant to Article 94(3) EPC for EP Application No. 18721876.3, dated Nov. 29, 2021, 6 pages.

* cited by examiner

Fig. 7

METHODS, APPARATUS AND COMPUTER-READABLE MEDIUMS RELATING TO SCHEDULING AND FEEDBACK SCHEMES FOR THE TRANSMISSION OF DATA PACKETS IN A WIRELESS COMMUNICATION NETWORK

CROSS-REFERENCE TO RELATED APPLICATIONS

This application is a National stage of International Application No. PCT/SE2018/050423, filed Apr. 25, 2018, which is hereby incorporated by reference.

TECHNICAL FIELD

Embodiments of the present disclosure relate to wireless communications networks. Particular embodiments relate to methods, apparatus and computer-readable mediums for selecting a feedback scheme associated with a data packet to be transmitted. Further embodiments relate to methods, apparatus and computer-readable mediums for scheduling data packets for transmission.

BACKGROUND

Efforts are on-going to develop the fifth generation of wireless communication standards (5G), with one such standard known as New Radio (NR). 5G communication networks are expected to enable numerous different use cases, with a wide range of different service criteria. For example, use cases may include enhanced mobile broadband (eMBB), in which mobile devices are able to receive exceptionally high downlink speeds, and massive machine type communications (mMTC), in which a large number of machine-type devices are expected to connect to the network potentially using low-power methods to maximize battery life.

Another use case is known as critical data transmissions, or ultra-reliable and low-latency communications (URLLC). Such transmissions place extremely high demands on network resources, with a combined requirement of low latency and high reliability, such as a loss ratio of $10^{-5}$ within 1 millisecond. Typical use cases are factory automation and smart grid.

One approach to reducing the latency for critical data transmissions is based on the scheduling of such transmissions.

For example, the network may treat data with a specific Quality of Service (QoS) requirement differently from other data which does not have that specific QoS requirement. Examples of the QoS parameters include Guaranteed Bit Rate (GBR) or non-Guaranteed Bit Rate (non-GBR), Priority Handling, Packet Delay Budget and Packet Error Loss rate.

In Long Term Evolution (LTE) and NR, UE data is treated according to the radio bearer to which the data belongs, and an indication of the QoS associated with the radio bearer. The indication of the QoS may comprise a QoS Class Identifier (QCI) in LTE or a 5G QoS Indicator (5QI) in NR. These parameters are used to ensure radio bearer traffic has an assigned priority level and QoS requirement. QoS of radio bearers is ensured by priority handling at the base station (e.g., eNB or gNB) for downlink data and a standardized logical channel prioritization procedure at the UE for uplink data.

After a new radio bearer is admitted, data is selected in the scheduler for transmission to the UEs. The data is selected first based on the priority level associated with the radio bearers. Thus data from radio bearers associated with a relatively high priority level may be selected for transmission prior to data from radio bearers associated with a relatively low priority level. Data associated with radio bearers having the same priority level is selected according to a scheduling algorithm.

One example of such a scheduling algorithm is a round-robin algorithm, which gives an equal share of resources to each radio bearer in a round-robin fashion and is very simple to implement. However, it does not take channel conditions into account for optimization purposes. For throughput maximization, the network should schedule the UE with the best channel conditions at each scheduling opportunity. However, this starves UEs experiencing poor channel conditions, for example, at the cell edge. On the other hand, an algorithm such as max-min signal to interference and noise ratio (SINR) fairness results in resource allocations where radio bearers with the same priority are guaranteed the same QoS. However, such solutions come at the expense of many resources being allocated to UEs experiencing poor channel conditions.

A good balance is achieved with proportional fairness, which is a well-known fairness metric that leads to a simple implementation. It selects the radio bearer with the largest ratio between its instantaneous data rate and its averaged data rate over a time period, such as one second. For example, where radio bearers are associated with different UEs, the scheduler may select the UE k* according to the following:

$$k^* = \arg\max_k \frac{c_k}{\bar{c}_k}$$

where $c_k$ is the instantaneous data rate from a channel quality indicator (CQI) report from UE k, and $\bar{c}_k$ is the average data rate of UE k.

After a packet is selected for transmission and a transport block is built, a link adaptation algorithm in the MAC layer aims to achieve a particular BLER target (e.g., 10%) for each transmission based on the latest CQI report for the UE. However, the CQI report may be outdated or otherwise inaccurate. Reliability is then guaranteed by hybrid automatic repeat request (HARQ) retransmission, which leads to an inevitable longer transmission latency. A pair of latency and reliability targets can be achieved by this best-effort and service-agnostic mechanism. One additional benefit of the service-agnostic approach is that the network load can be used as an accurate aggregated metric for admission control of new radio bearers.

New tools for scheduling have been developed or are under development in order to account for critical data transmissions or URLLC transmissions. For example, non-slot based transmission with flexible time duration (e.g., mini-slots) and options of higher subcarrier spacing in NR and short-TTI in LTE have been standardized to minimize the transmission duration. The UE processing time to generate ACK/NACK feedback is also very short: only two orthogonal frequency division-multiplex (OFDM) symbols. These two mechanisms aim to reduce the round-trip time in feedback mechanisms such as HARQ so that more transmissions can be squeezed into the latency budget. The duration of a mini-slot is flexible, ranging (for example)

from two OFDM symbols to a slot-length. A multiple-slot transmission can be scheduled for one transport block, to have a flexible and low coding rate to support different block error rate (BLER) targets. In addition, a non-slot-based transmission can pre-empt an on-going slot-based transmission so that additional resources can be made available for critical data transmissions.

To increase the reliability, HARQ-based retransmission can be used. HARQ retransmission is more spectrally efficient since retransmission is only needed if a previous transmission was unsuccessful. On the other hand, it requires a reliable control channel for feedback transmission, and may be challenging for extreme low latency use cases due to the round-trip-time between the transmission and the feedback.

To reduce the latency associated with HARQ-based retransmission, feedback-less transmission (also known as "repetition") has recently been agreed at 3GPP standardization meetings. According to this scheme, multiple copies of the same data are transmitted without the transmitter waiting for positive or negative feedback from the receiver. Such a scheme has lower latency than traditional HARQ methods, as it does not require feedback. However, the transmission of multiple copies of the same data is not an efficient use of spectral resources.

The above two transmission schemes (HARQ and repetition) are used, in combination with the proportional fairness algorithm, to achieve a high sum throughput.

This may be suitable for use cases such as eMBB. However, such scheduling approach does not work for URLLC, where performance is measured by reliability and latency, due to the very tight time-budget constraints of the service. Owing to URLLC transmissions, some UEs have to be prioritized simply because their data are more time-critical. However, the proportional fairness algorithm does not consider latency; it schedules UEs only based on their past throughput, relative to other UEs.

In addition, this approach does not take into account that some UEs need to be assigned resources even if their proportional throughput is not the maximum because otherwise their packets will be dropped. Thus, the system performance, as measured by number of served UEs (which is another way to measure system throughput) or end-to-end latency, will be degraded.

In summary, existing scheduler algorithms, such as the ones described in the previous subsection, do not consider latency and high-reliability requirements for scheduling decisions, such as those pertaining to critical data transmission. They also fail to consider additional scheduling tools in LTE rel-15 and NR for critical data transmission.

SUMMARY

Embodiments of the present disclosure seek to address one or more of these problems.

In one aspect, there is provided a method, performed by a node of a wireless communication network, for selecting a feedback scheme associated with transmission of data packets over one or more radio bearers to one or more wireless devices. The method comprises: upon receiving a data packet for transmission to a wireless device, starting a timer associated with the data packet, the timer being set to expire after a period of time which varies as a function of a latency requirement for the data packet; and, in dependence on a remaining time value for the timer, selecting one of a plurality of feedback schemes for transmission of the data packet.

The disclosure also provides a node configured to perform the method set out above.

In one aspect, the disclosure provides a node for a wireless communication network. The node comprises processing circuitry and a non-transitory machine-readable medium storing instructions which, when executed by the processing circuitry, cause the node to: upon receiving a data packet for transmission to a wireless device, start a timer associated with the data packet, the timer being set to expire after a period of time which varies as a function of a latency requirement for the data packet; and, in dependence on a remaining time value for the timer, select one of a plurality of feedback schemes for transmission of the data packet.

In another aspect, the disclosure provides a non-transitory machine-readable medium storing instructions which, when executed by processing circuitry of a node, cause the node to: upon receiving a data packet for transmission to a wireless device, start a timer associated with the data packet, the timer being set to expire after a period of time which varies as a function of a latency requirement for the data packet; and, in dependence on a remaining time value for the timer, select one of a plurality of feedback schemes for transmission of the data packet.

In a further aspect, the disclosure provides a node for a wireless communication network. The node comprises a timer module and a feedback selection module. The timer module is configured to, upon receiving a data packet for transmission to a wireless device, start a timer associated with the data packet, the timer being set to expire after a period of time which varies as a function of a latency requirement for the data packet. The feedback selection module is configured to, in dependence on a remaining time value for the timer, select one of a plurality of feedback schemes for transmission of the data packet.

In further aspects of the disclosure, there is disclosed a method, performed by a node of a wireless communication network, for selecting a data packet for transmission over one or more radio bearers to one or more wireless devices. The method comprises: upon receiving data packets for transmission to one or more wireless device, starting respective timers associated with each data packet, the timers being set to expire after respective periods of time which vary as a function of a latency requirement for the respective data packet; and, in dependence on remaining time values for the timers, selecting data packets for transmission to the one or more wireless devices.

The disclosure also provides a node configured to perform such a method.

In one aspect, the disclosure provides a node for a wireless communication network. The node comprises processing circuitry and a non-transitory machine-readable medium storing instructions which, when executed by the processing circuitry, cause the node to: upon receiving data packets for transmission to one or more wireless device, start respective timers associated with each data packet, the timers being set to expire after respective periods of time which vary as a function of a latency requirement for the respective data packet; and, in dependence on remaining time values for the timers, select data packets for transmission to the one or more wireless devices.

In another aspect, the disclosure provides a non-transitory machine-readable medium storing instructions which, when executed by processing circuitry of a node, cause the node to: upon receiving data packets for transmission to one or more wireless device, start respective timers associated with each data packet, the timers being set to expire after respective periods of time which vary as a function of a latency requirement for the respective data packet; and, in dependence on remaining time values for the timers, select data packets for transmission to the one or more wireless devices.

In a further aspect, the disclosure provides a node for a wireless communication network. The node comprises a timer module and a data selection module. The timer module is configured to, upon receiving data packets for transmission to one or more wireless device, start respective timers associated with each data packet, the timers being set to expire after respective periods of time which vary as a function of a latency requirement for the respective data packet. The data selection module is configured to, in dependence on remaining time values for the timers, select data packets for transmission to the one or more wireless devices.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION

Figure 1:
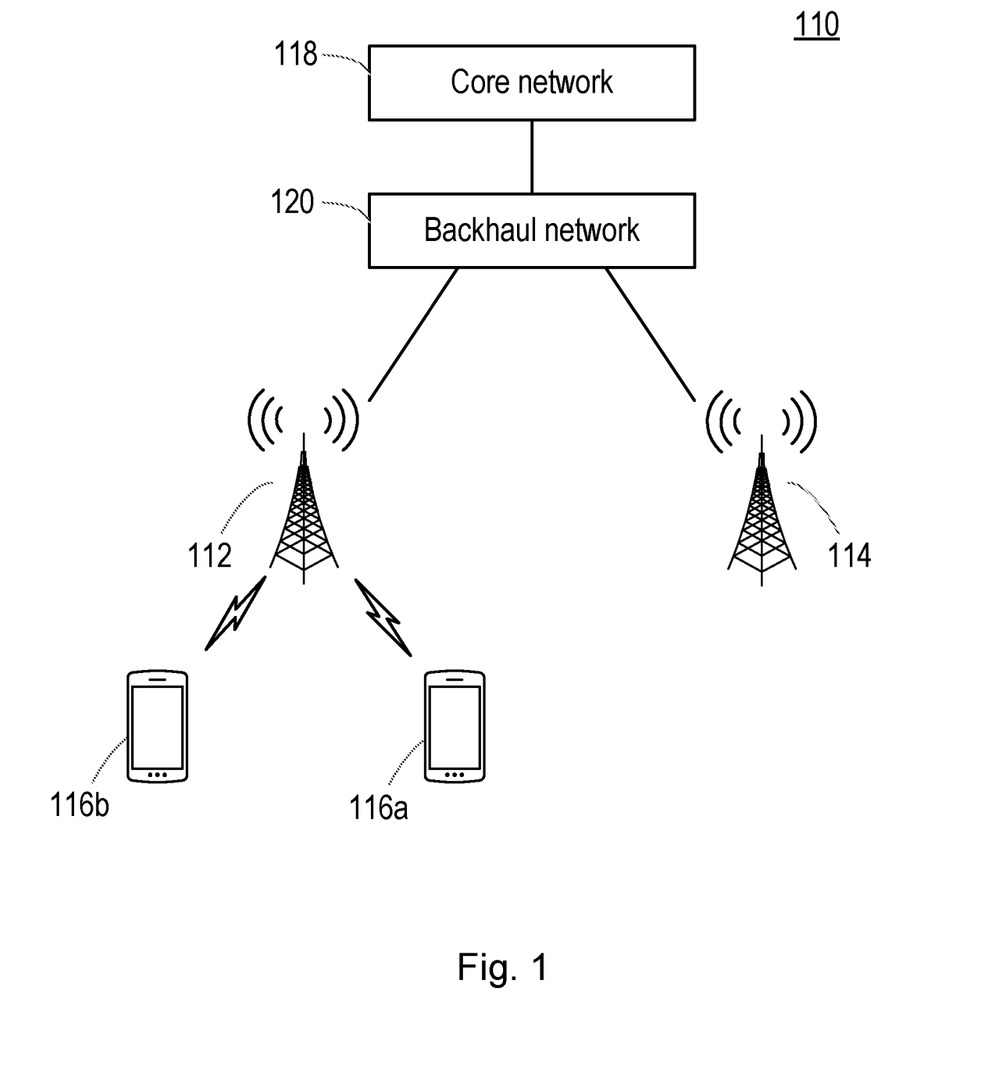
FIG. 1 shows a network according to embodiments of the disclosure.

FIG. 1 shows a communication network 110 according to embodiments of the disclosure.

The network 110 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 110 may be suitable for providing radio communications meeting one or more of the criteria established by the Next Generation Mobile Networks Alliance for the 5th generation of mobile telecommunications standards. In one embodiment, therefore, the communication network 110 may be a wireless cellular network.

The network 110 comprises one or more radio access nodes 112, 114. In the illustrated embodiment, two radio access nodes 112, 114 are shown, but the skilled person will appreciate that any number of radio access nodes may be provided.

The radio access nodes 112, 114 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The functions of the radio access nodes 112, 114 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

Each radio access node 112, 114 may serve one or more cells of the network 110. Within each cell, wireless devices communicate with the respective radio access node to provide services to users of the devices as will be familiar to those skilled in the art. Each radio access node 112, 114 further communicates with a core network 118 via a backhaul network 120, in order to co-ordinate and control the network 110, and provide access to other parts of the network 110 (e.g. devices in other cells, not illustrated). In FIG. 1, two wireless devices 116a, 116b (collectively, 116) are shown in communication with radio access node 112. The wireless devices 116 may also be known as user equipments (UEs), mobile devices, mobile terminal devices, wireless terminal devices, etc.

Although not explicitly shown in FIG. 1, the wireless terminals 116 may also be able to communicate wirelessly with the second radio access node 114. For example, the wireless terminals 116 may be configured with dual connectivity, whereby one or more radio bearers are established between the terminals 116 and each of the first and second radio access nodes 112, 114, or whereby one or more radio bearers are split between the first and second radio access nodes 112, 114 (or a combination of both).

Wireless signals are transmitted between the radio access node 112 and the wireless devices 116 using radio resources which are scheduled according to one or more scheduling algorithms. A scheduler may be provided in the radio access node 112 or logically coupled to the radio access node for this purpose. As used herein, "radio resources" refers to any available resource which can be used to transmit wireless signals, such as frequency (e.g. one or more frequency channels or sub-channels), time (e.g. one or more frames, sub-frames, time slots, etc.) or codes (e.g. as used for code-division multiplexing).

Thus, for downlink communications (i.e. from the radio access node 112 to the wireless devices 116), a pool of available radio resources is distributed for transmissions to the wireless devices 116 according to a scheduling algorithm. According to certain embodiments of the disclosure, the scheduling algorithm is adapted to take account of a latency requirement associated with the data to be transmitted. Further detail regarding this aspect will be discussed below with respect to FIG. 4.

Embodiments of the disclosure are also concerned with the feedback scheme associated with transmitted data.

Figure 2:
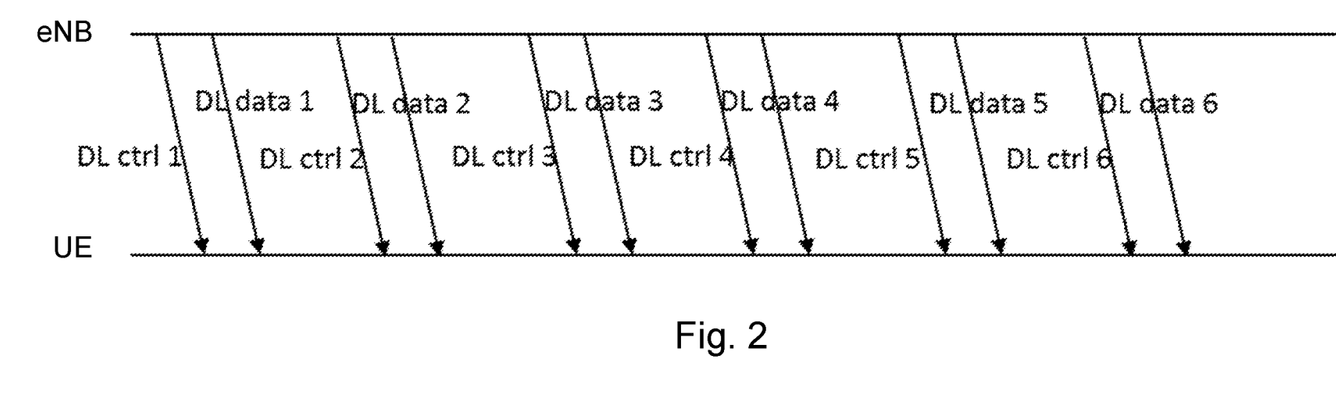
FIG. 2 is a signalling diagram showing a repetition feedback scheme according to embodiments of the disclosure.

FIG. 2 shows a first feedback scheme according to embodiments of the disclosure, in which feedback from a receiver (in the Figure, "UE") is not utilized by a transmitter (in the Figure, "eNB") to trigger retransmissions of a data packet.

The first feedback scheme involves the transmission of multiple duplicate data packets from the eNB to the UE, without waiting for or relying upon feedback messages from the UE to the eNB. In this way, high reliability is achieved without significant increases in latency.

Thus the eNB transmits downlink control data to the UE ("DL ctrl 1"). The control data may comprise an indication of resources on which a subsequent data transmission to the UE is to be made. For example, the indication of resources may be provided in a downlink control information (DCI) message. The eNB subsequently transmits data to the UE ("DL data 1"), using the indicated resources.

This process is repeated multiple times for subsequent copies or duplicates of the transmitted data packet. In the illustrated embodiment, the process is repeated five times, such that six duplicate copies are transmitted in total ("DL data 1" . . . , "DL data 6").

It will be noted that the signaling shown in FIG. 2 does not include any feedback messages (e.g., ACK/NACK) from the UE to the eNB. Such feedback messages may nonetheless be transmitted in accordance with the standard. However, in the first feedback scheme, the eNB does not utilize those feedback messages (e.g. NACKs) to trigger the retransmission of data packets. Rather, the duplicate copies are transmitted regardless of any feedback messages received from the UE.

Figure 3:
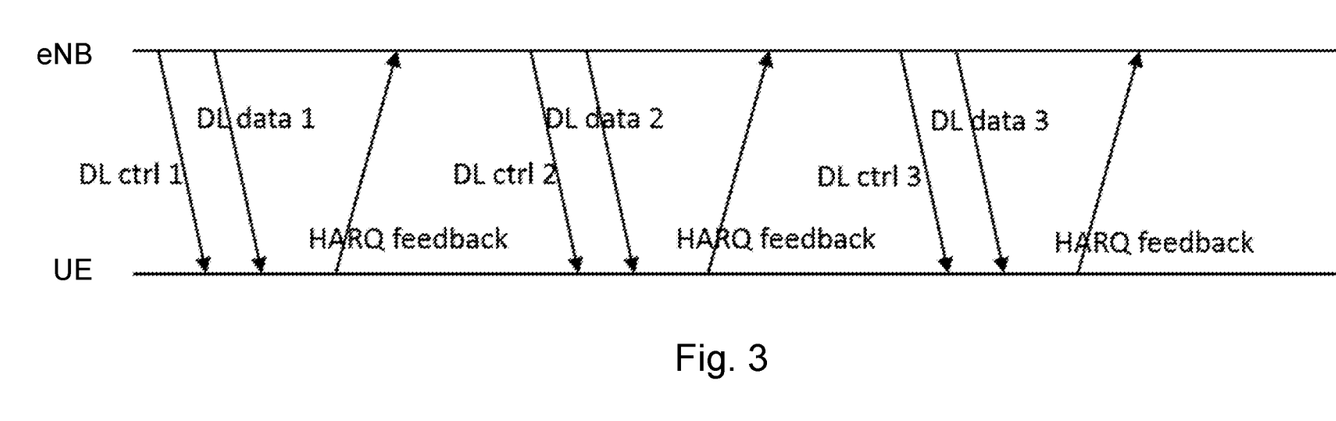
FIG. 3 is a signalling diagram showing a HARQ feedback scheme according to embodiments of the disclosure.

FIG. 3 shows a second feedback scheme according to embodiments of the disclosure, in which feedback from a receiver (in the Figure, "UE") is utilized by a transmitter (in the Figure, "eNB") to trigger retransmissions of a data packet. The second feedback scheme may comprise a HARQ or ARQ feedback scheme, for example.

The second feedback scheme involves the retransmission of data packets from the eNB to the UE in response to receipt of a negative feedback message from the UE to the eNB. In this way, high reliability is achieved but at the cost of increased latency.

Thus the eNB transmits downlink control data to the UE ("DL ctrl 1"). The control data may comprise an indication of resources on which a subsequent data transmission to the UE is to be made. For example, the indication of resources may be provided in a downlink control information (DCI) message. The eNB subsequently transmits data to the UE ("DL data 1"), using the indicated resources.

The UE receives the data, attempts to decode it, and then transmits a feedback message ("HARQ feedback") based on the decoding success. If decoding is successful, the feedback message may comprise an ACK message; if decoding is unsuccessful, the feedback message may comprise a NACK message.

In the illustrated embodiment, the UE is unable to decode the DL data 1 transmission, and thus transmits a negative acknowledgement (NACK) message to the eNB. The eNB receives and decodes this feedback message, and prepares a retransmission of the data to the UE. Thus the eNB transmits downlink control data to the UE in respect of the retransmission ("DL ctrl 2"). The control data may comprise an indication of resources on which the data retransmission to the UE is to be made. For example, the indication of resources may be provided in a downlink control information (DCI) message. The eNB subsequently retransmits the data to the UE ("DL data 2") using the indicated resources.

In the illustrated embodiment, failure to decode the data at the UE leads to two retransmissions of the data from the eNB to the UE, and thus three transmissions of the data overall. From a comparison of the signaling in FIGS. 2 and 3, it will be clear that the additional signaling in the second feedback scheme means that fewer (re)transmissions are possible than the first feedback scheme over the same time frame.

Figure 4:
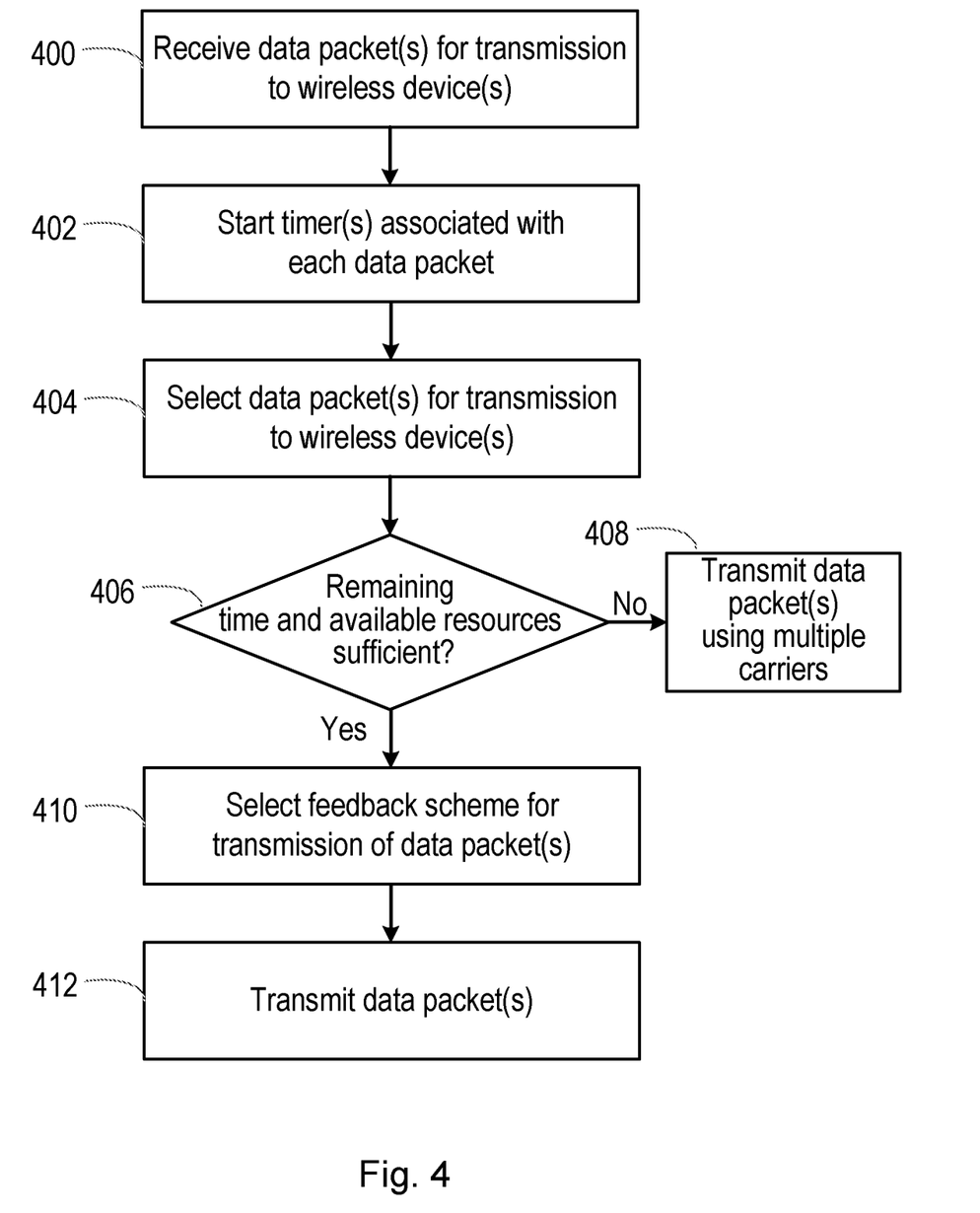
FIG. 4 is a flowchart of a method according to embodiments of the disclosure.

FIG. 4 is a flowchart of a method according to embodiments of the disclosure. The method may be performed in node of a wireless communication network, such as a radio access node (e.g., radio access node 112) or a scheduler forming part of such a radio access node or being in communication with such a radio access node.

The method begins in step 400, in which the node receives one or more data packets for transmission to one or more wireless devices (e.g., UEs). For example, such data packets may be received from a backhaul network (e.g., the backhaul network 120) or from a core network (e.g., the core network 118).

Each data packet may be associated with a particular radio bearer, such that the node may handle data for multiple radio bearers. Each radio bearer is associated with data for a particular wireless device, but multiple radio bearers may be associated with data for the same wireless device (e.g., multiple radio bearers may be established between a radio access node and the same wireless device).

Each radio bearer is associated with a latency requirement, e.g., a maximum latency or delay which the data can experience before being transmitted. Each radio bearer may also be associated with a priority level or value, and a reliability target (e.g. a block error loss rate or packet error loss rate). Each of these parameters may be defined as part of a QoS class with which the radio bearer is associated, such as a QCI or a 5QI, for example. The QoS class may be determined by an index value pointing to one of a plurality of predefined or preconfigured QoS classes.

In step 402, the node starts respective expiry timers for each of the data packets received in step 400. For example, the expiry timers may be started upon receipt of the data packets, or upon those data packets being added to one or more queues for transmission by the node.

Figure 5:
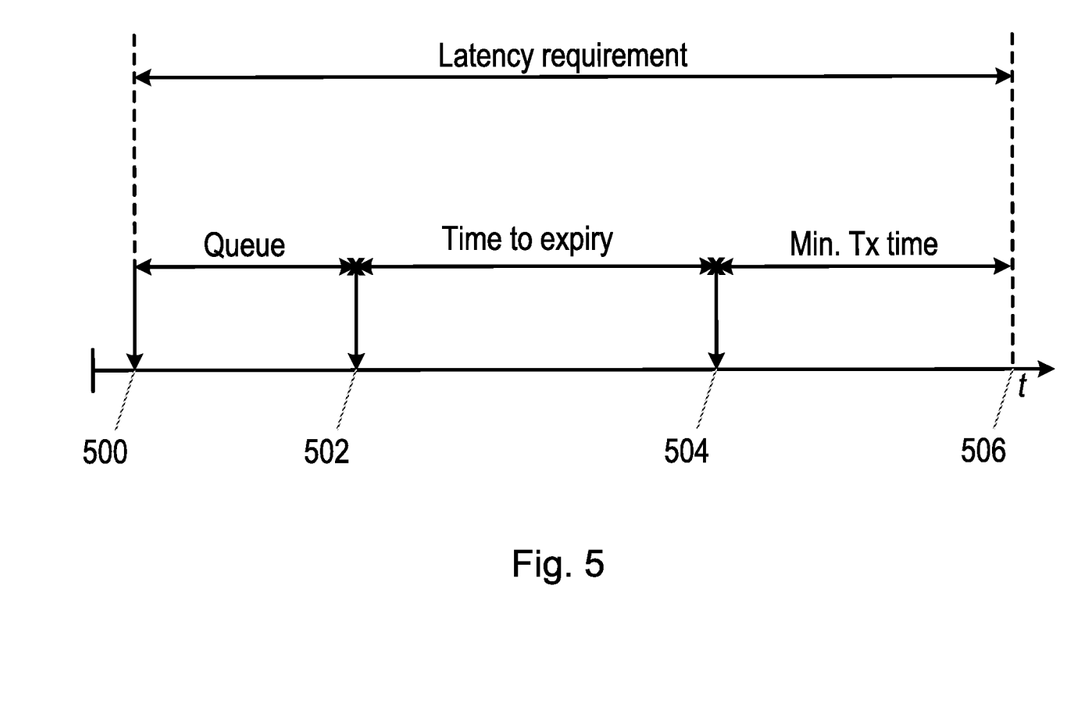
FIG. 5 is a timing diagram showing implementation of a timer according to embodiments of the disclosure.

FIG. 5 shows the implementation of an expiry timer for a particular data packet according to embodiments of the disclosure.

The packet is received at time 500 and added to a queue for transmission. The overall latency requirement for the data packet (e.g., as specified in a QCI or 5QI) is illustrated in FIG. 5 and extends from time 500 to time 506.

A minimum transmission time ("Min. Tx time") is illustrated, and is the amount of time required to prepare the data packet for transmission and to transmit the data packet, following selection of the data packet for transmission. In the illustrated embodiment, the minimum transmission time extends backwards in time from the maximum latency requirement for the data packet at time 506, to a time 504. Thus if the data packet has not been selected for transmission by time 504, it is not then possible to transmit the data packet and meet the latency requirement.

The expiry timer relates to the amount of time available before the data packet must be selected for transmission by a scheduling algorithm, if it is to be transmitted and meet its latency requirement. In one embodiment, the expiry timer is set to expire after a time based on the latency requirement and the minimum transmission time. For example, the expiry timer may be set to expire at a time equal to the latency requirement or budget of the data packet, less the minimum transmission time.

Those skilled in the art will appreciate that timers may be implemented by counting down from an initial, set value to expire at zero (or some other reference value), or by counting up from some reference value (e.g., zero) to expire at some set value. The present disclosure is not limited in that regard.

In the embodiment of FIG. 5, therefore, the data packet is received and its respective expiry timer is started, set to expire at a time equal to the latency requirement minus the minimum transmission time. In the meantime, the data packet remains in a queue, awaiting selection for transmission by the scheduling algorithm. Thus, at some time 502, the data packet has been in the queue since time 500, and has the remaining time on the expiry timer (until time 504) in which to be selected by the scheduling algorithm for transmission and still meet its latency requirement (by time 506).

The time quantity may be counted using any suitable units, such as a time unit (e.g. millisecond, seconds, etc.) or a unit which is equivalent to time (e.g. number of minimum transmission times).

Returning to FIG. 4, the method proceeds in step 404 to select data packets for transmission to wireless devices served by the radio access node. As noted above, the data packets may be associated with radio bearers, and thus this step may involve the selection of one or more of a plurality of radio bearers for transmission from the radio access node.

In embodiments where the data packets are associated with respective priority values, step 404 may comprise a step of first selecting data packets for transmission based on those priority values. For example, in one embodiment, data packets having relatively higher priority values are selected for transmission prior to data packets having relatively lower priority values.

Where two or more data packets have the same priority value, a scheduling algorithm is used to select between those two or more data packets. In some embodiments, the scheduling algorithm may be one or more of a round-robin algorithm; an algorithm which selects radio bearers associated with a wireless device having the best channel conditions; an algorithm such as max-min signal to interference and noise ratio (SINR) fairness; and proportional fairness.

In some particular embodiments of the disclosure, however, the scheduling algorithm takes into account the current values of the expiry timers associated with each data packet and defined above with respect to FIG. 5. For example, where the scheduling algorithm is based on the proportional fairness algorithm (also described above), data from a radio bearer k* may be selected for transmission from among k radio bearers (e.g. having the same priority) according to the following function $$k^* = \arg\max_k \left( \frac{c_k}{\bar{c}_k}, t_k \right)$$

where $c_k$ is the instantaneous data rate of the wireless device associated with radio bearer k, $\bar{c}_k$ is the average data rate of the wireless device, and $t_k$ is the current expiry timer value for radio bearer k. The instantaneous data rate is translatable from a channel quality indicator (CQI) report from the wireless device.

The function $f$ is a decreasing function over $t_k$ (in embodiments where the expiry timers count down from their initial, set value to zero). Some suitable examples of functions are as follows:

$$f = \frac{c_k}{c_k \alpha t_k}, f = \frac{\alpha c_k}{\bar{c}_k} + \frac{\beta}{t_k}, f = \left( \frac{\alpha c_k}{\bar{c}_k} \right)^{\frac{1}{n_k}}$$

where α and β are constants. In these examples, the function thus changes gradually as the data packets get closer to their expiry.

Alternatively, the function may be discontinuous and arranged to change from some low value to some high value at a defined value of $t_k$. For example, $$f = \frac{c_k}{\bar{c}_k}, \forall\, t_k > T_{MIN}$$

$$f = f_{MAX}, \forall\, t_k \leq T_{MIN}$$

where $f_{MAX}$ and $T_{MIN}$ are configured parameters. Thus, in this example, the function is equivalent to the conventional proportional fairness algorithm for those data packets whose expiry timers are not close to zero (i.e. greater than $T_{MIN}$), but promotes those data packets whose expiry timers are close to zero (i.e. less than $T_{MIN}$).

Further scheduling algorithms are possible which take account of the expiry timers associated with the data packets. For example, the scheduling algorithm may utilize the round-robin algorithm, parameterized by the expiry timers in a similar manner to the proportional fairness algorithm discussed above. In such embodiments, multiple stages of round robins may be conducted, with each stage associated with a particular range of expiry timer values. Data packets with relatively low expiry timer values may be the subject of a first round robin stage (and so prioritized); data packets with relatively higher expiry timer values may be the subject of a second round robin stage, and so on. In such a two-stage algorithm, the first stage may be applied for all data that have $t_k \leq T_{MIN}$, while the second stage is used for the allocation of the remaining resources for all other data that do not satisfy that condition.

In a further embodiment, the data packets may be ranked in order of their expiry timer values (with low values being prioritized). The scheduling algorithm may select data packets for transmission in this order, such that the latency-critical data packets are selected for transmission before data packets with less-critical expiry timers. This embodiment has the advantage of being extremely simple to implement.

Once a particular data packet is selected for transmission, in step 406 the node determines whether the remaining expiry time associated with the data packet, and the resources available to the radio access node, are sufficient to meet the reliability requirement associated with the data packet.

According to embodiments of the disclosure, step 406 may involve monitoring the bandwidth available to the radio access node and the remaining time on the expiry timer, and assessing whether there are sufficient resources to meet the reliability target associated with the data packet before the expiry timer expires. For example, the remaining time may be equivalent to a particular number of retransmissions (using any feedback scheme—see step 410 below). If the probability of error in an original transmission is $P_0$ and the probability of error in an i-th retransmission is $P_i$, the overall probability of error P is $$P = \prod_i P_0 P_i$$

where $P_i \neq P_0$ due to correlation between (re)-transmissions.

If the available bandwidth and number of retransmissions i are such that P does not meet the reliability target associated with the data packet, the method proceeds to step 408, in which the data packet is transmitted using multiple carriers. Thus the reliability of the transmission may be increased by transmitting duplicates of the data packet via multiple carriers. Such carriers may be established between the particular wireless device and the radio access node (e.g. node 112) using carrier aggregation, or between the particular wireless device and multiple radio access nodes (e.g., nodes 112, 114) using dual connectivity. In either case, where there are K carriers (and K is an integer greater than 1), the probability of error P' is $$P' = \prod_{1 \leq k \leq K} P_k^{(1-\rho)}$$

where ρ models the correlation among carriers, such that ρ=0 means independent transmissions among carriers and ρ=1 implies fully correlated transmissions among carriers.

If it is determined in step 406 that there are sufficient resources to meet the reliability target, or additional carriers have been established in order to meet the reliability target in step 408, the method proceeds to step 410 in which a feedback scheme from a plurality of feedback schemes is selected for the transmission of the data packet.

In some embodiments, step 410 may involve a selection between two types of feedback scheme: a first feedback scheme, in which feedback from the wireless device is not utilized by the node to trigger retransmissions of the data packet (e.g., as described above with respect to FIG. 2); and a second feedback scheme, in which feedback from the wireless device is utilized by the node to trigger retransmissions of the data packet (e.g., as described above with respect to FIG. 3). The first feedback scheme may involve the transmission of multiple duplicate copies or repetitions of the data packet, regardless of any feedback received from the wireless device. The second feedback scheme may comprise ARQ or HARQ feedback schemes.

In one embodiment, if the remaining expiry time value permits at least one feedback-based retransmission, the second feedback scheme is chosen; if the remaining expiry time value does not permit at least one feedback-based retransmission, the first feedback scheme is chosen. Feedback-based retransmission is more spectrally efficient, and thus such an embodiment makes more efficient use of the spectral resources available to the node. The amount of time for a feedback-based retransmission may comprise one or more of: the amount of time for the radio access node to prepare and transmit an initial transmission of the data packet; the amount of time for the wireless device to receive and attempt to decode the data packet; the amount of time for the wireless device to prepare and transmit a feedback message; the amount of time for the radio access node to receive and decode the feedback message; and the amount of time for the radio access node to prepare and transmit a retransmission of the data packet. The overall amount of time may be fixed or predefined in the node.

Step 410 may also comprise selection of the number of repetitions (where the first feedback scheme is chosen) or retransmissions (where the second feedback scheme is chosen). In one embodiment, the number is chosen as:

1. First feedback scheme: In this scenario, the fewer the repetitions, the better the spectral efficiency. However, repetition of the control channel transmissions may be needed if the control channel reliability target is not satisfied. Therefore, the number of transmissions may be set equal to the minimum number required for the repetition of the control channel to meet the overall reliability target associated with the data packet.
2. Second feedback scheme: The maximum number of retransmissions is determined by time-to-expiry constraints and the fixed round-trip-time for feedback (e.g. HARQ). Any number between one and the maximum number can be chosen.

In another embodiment, the number of transmissions may be determined as a function of the network load experienced by the radio access node. For example, in both first and second feedback schemes:

1. If the load is low (e.g. below some threshold value), the number of retransmissions/repetitions may be set to a relatively high value (e.g., a maximum value).
2. Else, the number of retransmissions/repetitions may be set to a relatively low value (e.g., a minimum value).

By following such a scheme, resources are not tied or pre-booked early so that resources are available in case a new bearer arrives when the load is high.

In step 412, the data packets are transmitted by the radio access node.

Figure 6:
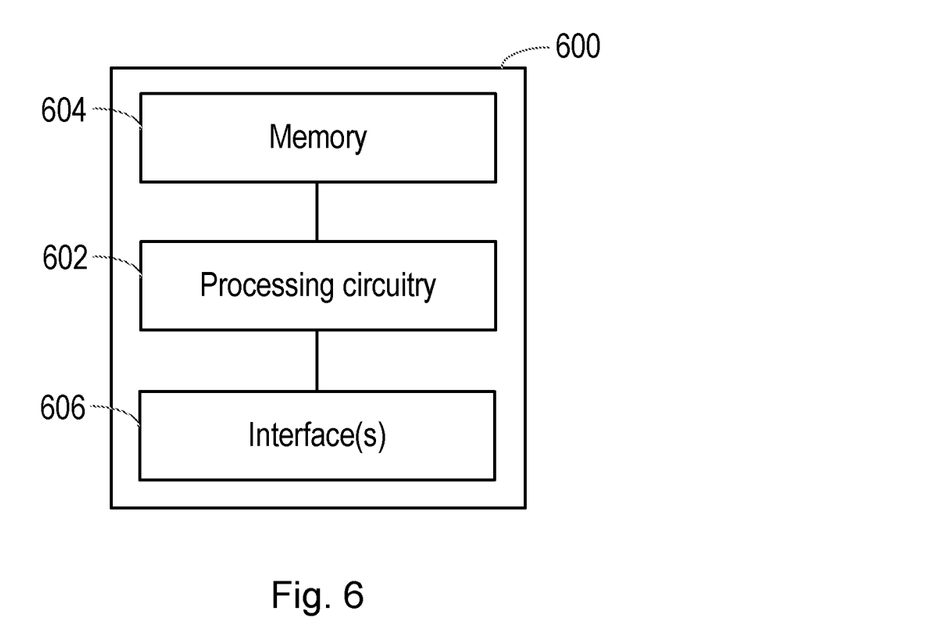
FIG. 6 is a schematic diagram of a node according to embodiments of the disclosure.

FIG. 6 is a schematic drawing of a node 600 according to embodiments of the disclosure. The node 600 may be suitable for carrying out the method described above, and particularly with respect to FIG. 4, for example.

The node 600 comprises processing circuitry 602 and a non-transitory computer-readable medium 604 (such as memory) communicatively coupled to the processing circuitry 602.

In one embodiment, the medium 604 stores instructions which, when executed by the processing circuitry 602, cause the node 600 to: upon receiving a data packet for transmission to a wireless device, start a timer associated with the data packet, the timer being set to expire after a period of time which varies as a function of a latency requirement for the data packet; and, in dependence on a remaining time value for the timer, select one of a plurality of feedback schemes for transmission of the data packet.

In further embodiments, the node 600 comprises one or more interfaces 606, for receiving signals and/or data from other nodes or devices in the communication network. For example, such interfaces 606 may comprise circuitry and/or software suitable for the generation and/or reception of one or more of electrical signals, wireless signals and optical signals.

Figure 7:
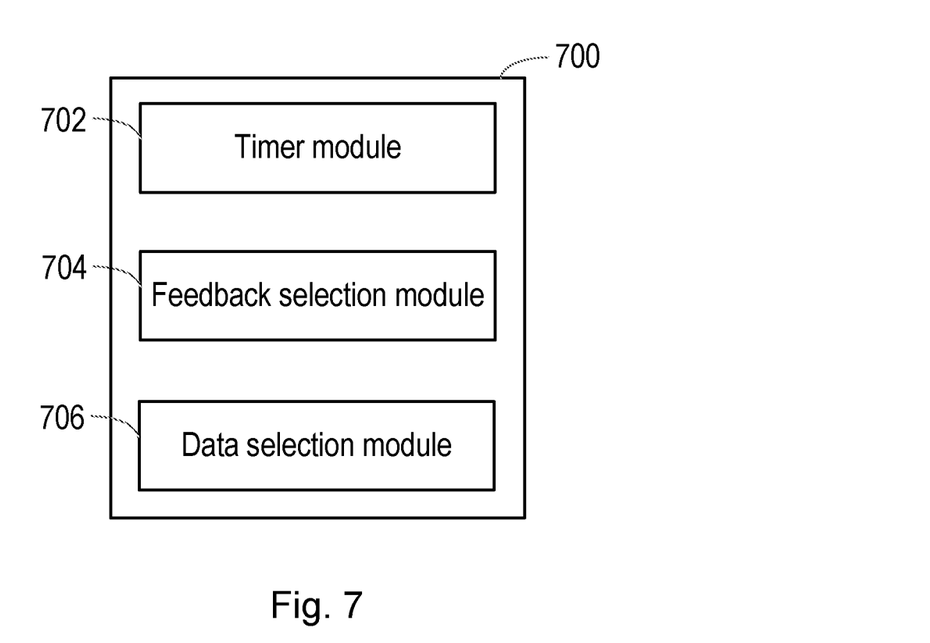
FIG. 7 is a schematic diagram of a node according to further embodiments of the disclosure.

FIG. 7 is a schematic drawing of a node 700 according to embodiments of the disclosure. The node 700 may be suitable for carrying out the method described above, and particularly with respect to FIG. 4, for example.

The node 700 comprises a timer module 702, a feedback selection module 704 and a data selection module 706.

In one embodiment, the timer module 702 is configured to, upon receiving a data packet for transmission to a wireless device, start a timer associated with the data packet, the timer being set to expire after a period of time which varies as a function of a latency requirement for the data packet. The feedback selection module 704 is configured to, in dependence on a remaining time value for the timer, select one of a plurality of feedback schemes for transmission of the data packet.

In further additional or alternative embodiments, the data selection module 706 is configured to select data for transmission by a radio access node in dependence on the remaining time value for the timer.

In one embodiment, the modules of the node 700 are implemented purely in software. In another embodiment, the modules of the node 700 are implemented purely in hardware. In a further embodiment, the modules of the node 700 are implemented in a combination of software and hardware.

The present disclosure thus provides methods, apparatus and computer-readable mediums relating to the transmission of data packets in a wireless communication network. A timer is associated with each data packet, set to expire after a period of time which varies as a function of a latency requirement for the data packet. In one embodiment, a feedback scheme is selected in dependence on a remaining time value for the timer. In another embodiment, the data packets are selected for transmission in dependence on the remaining time value for the timer.

Although the text above has described embodiments of the disclosure in the context of the 3GPP specifications, specifically Long Term Evolution and developments thereto, those skilled in the art will appreciate that the methods, apparatus and concepts described herein may equally apply to other radio access technologies and the networks that employ them.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method, performed by a node of a wireless communication network, for selecting a feedback scheme associated with transmission of data packets over one or more radio bearers to one or more wireless devices, the method comprising:
   upon receiving a data packet for transmission to a wireless device, starting a timer associated with the data packet, the timer being set to expire after a period of time which varies as a function of a latency requirement associated with a radio bearer for the data packet, wherein the latency requirement for the radio bearer is determined based on a Quality of Service (QoS) class associated with the radio bearer; and
   in dependence on a remaining time value for the period of time of the timer, selecting one of a plurality of feedback schemes for transmission of the data packet, wherein the selecting of one of the plurality of feedback schemes comprises:
      selecting a first feedback scheme, in which feedback from the wireless device is not utilized by the node to trigger retransmission of the data packet, responsive to a determination that the remaining time value is less than an amount of time required for retransmission of the data packet following negative feedback from the wireless device; and
      selecting a second feedback scheme, in which feedback from the wireless device is utilized by the node to trigger retransmission of the data packet, responsive to a determination that the remaining time value is greater than an amount of time required for retransmission of the data packet following negative feedback from the wireless device.

2. The method according to claim 1, wherein the second feedback scheme comprises automatic repeat request (ARQ) or hybrid automatic repeat request (HARQ).

3. The method according to claim 1 further comprising, responsive to selection of the first feedback scheme, transmitting multiple duplicate copies of the data packet to the wireless device.

4. The method according to claim 3, wherein a number of multiple duplicate copies varies in dependence on one or more of a reliability target associated with the data packet, and the remaining time value for the timer.

5. The method according to claim 3, wherein a number of multiple duplicate copies varies in dependence on a traffic load in the node.

6. The method according to claim 1 further comprising:
   responsive to a determination that one or more of the remaining time value for the timer and available radio resources for transmission of the data packet are insufficient to meet a reliability target associated with the data packet, initiating transmission of multiple duplicate copies of the data packet to the wireless device via a plurality of carriers.

7. The method according to claim 1, wherein the node comprises one or more queues storing data packets for transmission to a plurality of wireless devices, each data packet having an associated timer being set to expire after a period of time which varies as a function of a latency requirement for a respective radio bearer, and further comprising selecting a data packet for transmission in dependence on a function which is dependent on the remaining time values for each timer.

8. The method according to claim 7, wherein the data packet is selected for transmission in dependence on a function which is configured to increase as the remaining time value decreases.

9. The method according to claim 7, wherein the data packet is selected for transmission in dependence on a function which is configured to vary between two or more discrete values based on a comparison between the remaining time value and a threshold.

10. The method according to claim 7, wherein the data packet is selected for transmission in dependence on a function which is further dependent on a data rate associated with the wireless device to which the data packet is to be transmitted.

11. The method according to claim 10, wherein the data rate is defined as a ratio of an instantaneous data rate to an average data rate.

12. The method according to claim 10, wherein the data packet is selected for transmission in dependence on a function which is configured to increase as channel quality increases.

13. The method according to claim 7, wherein the data packet is selected for transmission in further dependence on a priority value associated with the data packet.

14. The method according to claim 13, wherein the selecting the data packet for transmission comprises selecting a data packet associated with the highest priority value.

15. A node of a wireless communication network for selecting a feedback scheme associated with transmission of data packets to one or more wireless devices, the node comprising:
   a processing circuitry; and
   a memory containing instructions which, when executed by the processing circuitry, cause the node to:
      upon receiving a data packet for transmission to a wireless device, start a timer associated with the data packet, the timer being set to expire after a period of time which varies as a function of a latency requirement associated with a radio bearer for the data packet, wherein the latency requirement for the radio bearer is determined based on a Quality of Service (QoS) class associated with the radio bearer; and in dependence on a remaining time value for the period of time of the timer, select one of a plurality of feedback schemes for transmission of the data packet wherein to select one of the plurality of feedback schemes comprises the node to:

select a first feedback scheme, in which feedback from the wireless device is not utilized by the node to trigger retransmission of the data packet, responsive to a determination that the remaining time value is less than an amount of time required for retransmission of the data packet following negative feedback from the wireless device; and select a second feedback scheme, in which feedback from the wireless device is utilized by the node to trigger retransmission of the data packet, responsive to a determination that the remaining time value is greater than an amount of time required for retransmission of the data packet following negative feedback from the wireless device.

16. The node according to claim 15, wherein the second feedback scheme comprises automatic repeat request (ARQ) or hybrid automatic repeat request (HARQ).

17. The node according to claim 15 further comprising, responsive to selection of the first feedback scheme, to transmit multiple duplicate copies of the data packet to the wireless device.

* * * * *